Jan. 26, 1932.  F. L. SESSIONS  1,842,461
APPARATUS FOR ELECTRIC HEATING AND WELDING
Filed March 5, 1929  2 Sheets-Sheet 1
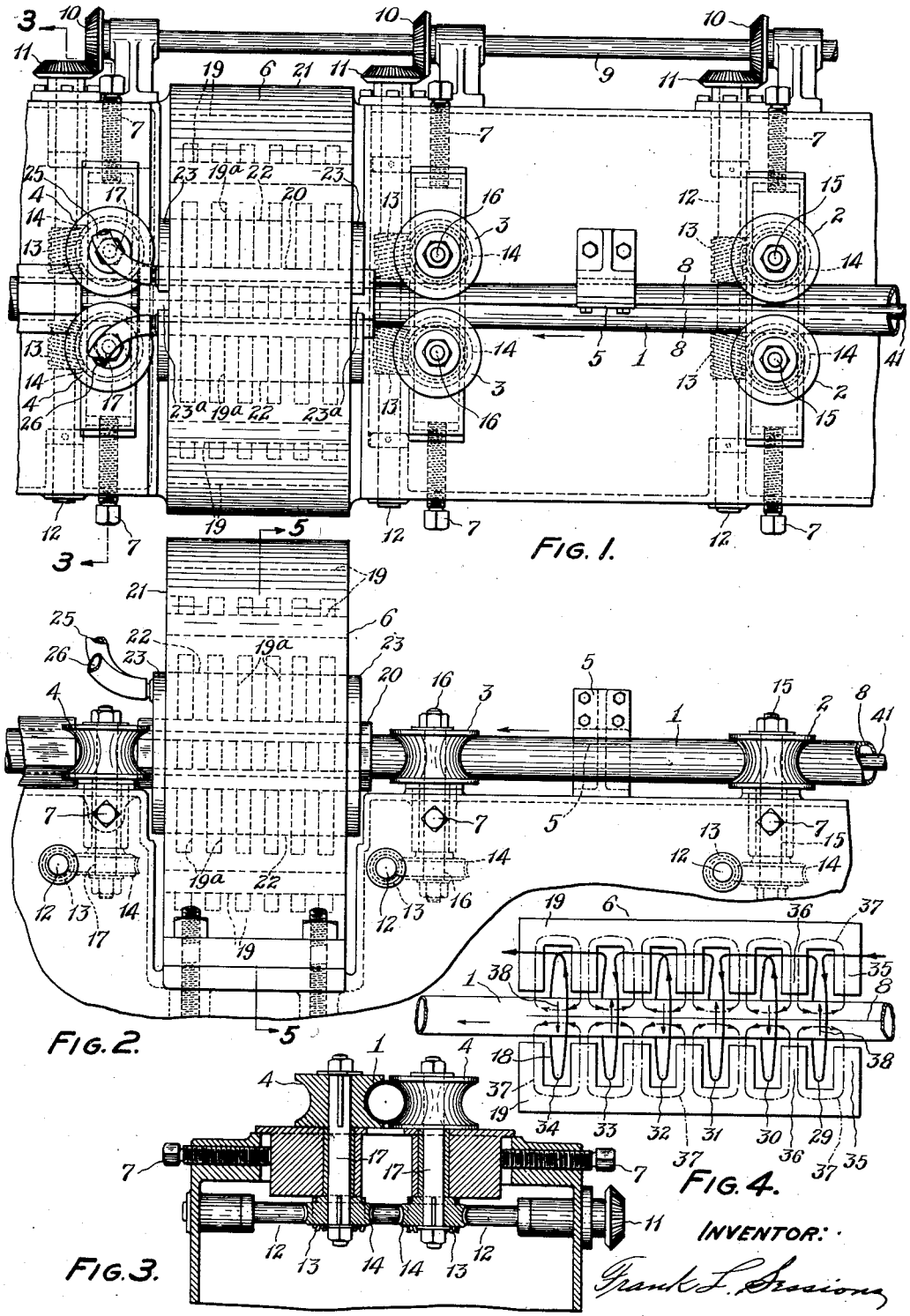

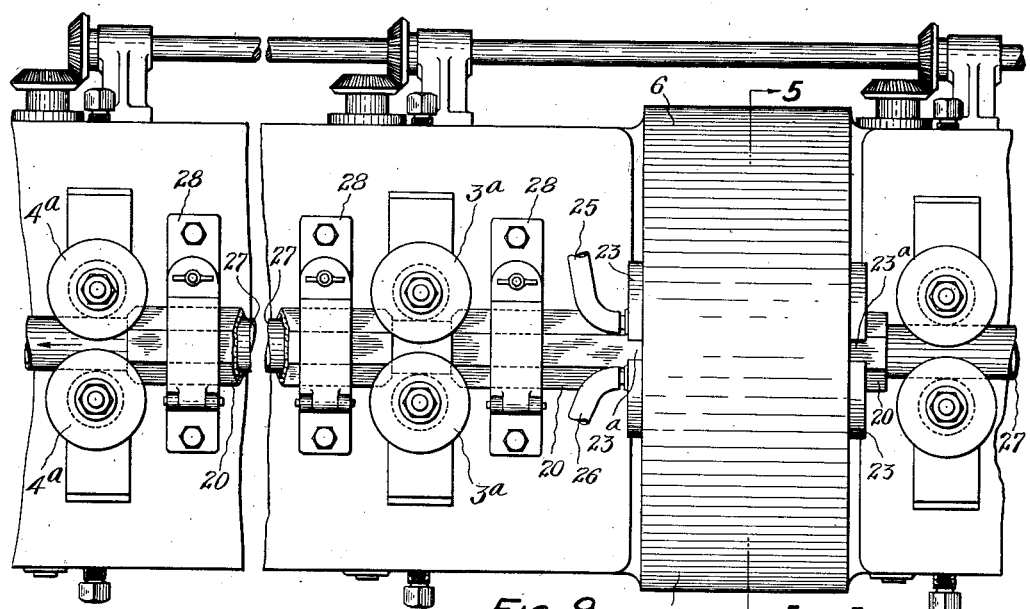
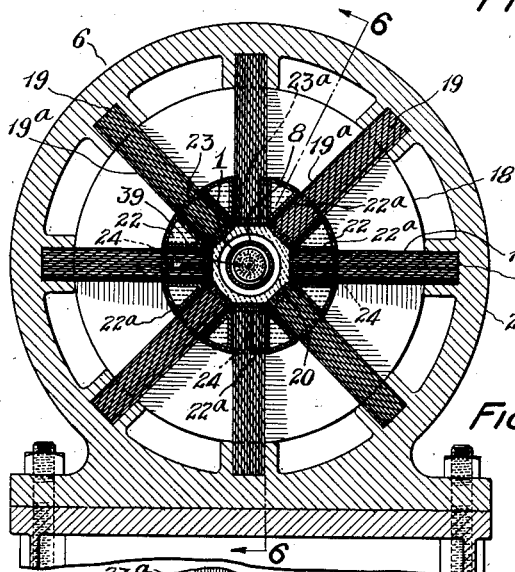
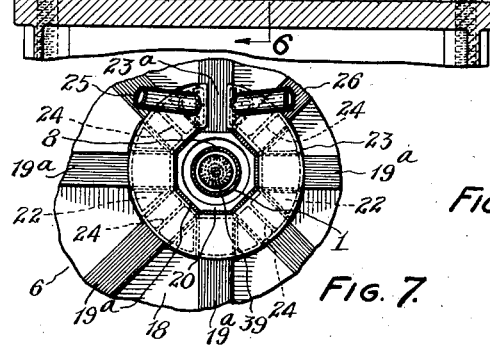
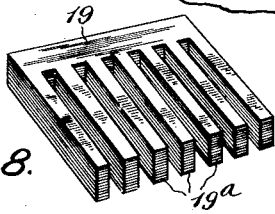

Patented Jan. 26, 1932

1,842,461

UNITED STATES PATENT OFFICE

FRANK L. SESSIONS, OF LAKEWOOD, OHIO

APPARATUS FOR ELECTRIC HEATING AND WELDING

Application filed March 5, 1929. Serial No. 344,377.

The broad principle of the method utilized in the apparatus shown and described in this application is disclosed in my United States Patents Nos. 1,365,198 and 1,365,199, issued on January 11, 1921. This application is directed to improvements in the general subject matter of the above patents.

My present invention relates to apparatus for progressive electric induction welding or heating. In this method there is no electric contact necessary between the current-carrying parts of the current inducing apparatus and the work to be welded or heated. The heating of the work is accomplished by causing the work to be traversed by a field or fields of alternating magnetic lines of force of suitable frequency in such manner that the electromotive forces induced in the work cause electric currents to flow in the work and heat it to the desired temperature. If the material being heated be magnetic its hysteresis losses will also aid in raising its temperature.

The alternating magnetic field or fields of force are preferably set up by alternating electric current that is caused to flow in a suitably disposed energizing coil or coils and when the work is passed through this rapidly alternating magnetic field or fields energized by such coil or coils, electric currents are induced in the work causing the work to be heated.

The degree of heating to be attained depends on the purpose for which the heat is desired, that is, whether welding, annealing, soldering, brazing or other heat-effected operation is to be carried out. The heat produced in the work is proportional to the square of the current induced and the induced current may be controlled by varying the number of magnetic lines of force that "cut" the work. This may be done by increasing or decreasing the current in the energizing coil or coils, by varying the magnetic reluctance of the magnetic circuit through which the lines of force set up by the current in the energizing coils pass, by varying the frequency of the energizing current, or by other known means or method.

Among the objects of my invention are:

The provision of an electric induction heating apparatus in which heating currents are induced in the work.

The provision of apparatus for inducing electric heating currents in the work in which a series of energizing coils surround the work, these coils being separated by laminated poles of magnetic material which extend into close proximity with the work and conduct the magnetic lines of force thereto.

The provision of electric induction heating or welding apparatus which is adapted to heat the work as it passes continuously through the alternating electro-magnetic field of force.

The provision of apparatus for welding or annealing tubes in which a series of energizing coils surround a tube of porcelain or other heat resisting material adapted to have the work passed through it, said coils being axially spaced and held in position by laminated cores of magnetic material supported between the coils and extending radially outward from the porcelain tube.

The provision of apparatus for inducing electric heating currents in the work in which a series of spaced energizing coils are so disposed as to induce currents in the work in closely adjacent zones of the work for the purpose of shortening the time required for the passing of a given portion of the work from the magnetic field of one coil to that of the next.

The provision of an induction heating or welding apparatus having radially disposed laminated magnetic cores forming substantially continuous pole faces around the work.

The provision of apparatus for heating elongated metal tubes or bars in which a series of energizing coils surround the work, said coils being axially spaced by laminated cores of magnetic material which extend outwardly from the work between the coils, the outer ends of said cores being magnetically joined by suitable yokes of magnetic material extending longitudinally of the axis of the coils.

The provision of means for water cooling induction welding or heating apparatus to protect the coils and magnet cores from the heat developed in the work.

The provision of an induction tube welder embodying means for guiding the unwelded seam of the tube up to the heating apparatus and means for transversing the tube continuously through the magnetic field or fields set up by the energizing coils.

The provision of an induction heating or welding apparatus which comprises a number of coils so wound and so energized that their magnetic fields act consecutively on the work as is passes through them to produce a cumulative heating effect.

These and other objects are accomplished by the use of my invention.

Referring to the drawings:

Fig. 1 is a plan view of a machine adapted to weld tube or pipe in accordance with my invention.

Fig. 2 is a side elevation of the apparatus shown in Fig. 1.

Fig. 3 is a vertical cross-section on line 3—3 of Fig. 1.

Fig. 4 is a diagrammatic view showing the flow of current in the coils, the paths of the lines of force set up by said current and the direction of the currents induced in the tube.

Fig. 5 is a vertical cross-section on line 5—5 of Figs. 2 and 6, showing the construction of the heating unit.

Fig. 6 is a vertical axial section of the heating unit taken on line 6—6 of Fig. 5.

Fig. 7 is a fragmentary end elevation of the heating unit taken on line 7—7 of Fig. 6 and showing header of water cooling system.

Fig. 8 is a detached perspective view of one of the laminated magnetic cores with its plurality of radial poles.

Fig. 9 is a view similar to Fig. 1 but showing the invention adapted to the annealing of tubes.

In Fig. 1 the tube 1 is shown as being fed continuously, in the direction indicated by the arrow, by the three pairs of driven rolls 2, 2, 3, 3 and 4, 4. As this apparatus is designed for welding the seam in a pre-formed tube a seam guide 5 may be provided. This may be of any convenient known form and serves to keep the seam in the proper relation to the pressure rolls 3, 3 and 4, 4.

The three pairs of rolls 2, 2, 3, 3 and 4, 4 are so mounted that the distance between the opposite rolls of each pair may be varied by means of screws 7. By adjusting these screws the desired amount of pressure of the rolls on the tube may be secured. The rolls, 2, 2 are feed rolls but may be a roll-pass of the tube forming machine if the tube is fed directly from the forming machine to the welding machine. Rolls 3, 3 also serve as feed rolls and may be adjusted towards and from each other to vary the pressure of the seam edge surfaces 8 upon each other to produce electrical contact between them so that the welding current may flow across the seam as will be later explained. Rolls 4, 4 have the same functions as rolls 3, 3 and in addition they produce the pressure on the heated seam edges necessary for completing the weld.

The shaft 9 may be driven by any suitable source of power and has mounted upon it bevel gears 10 which mesh with corresponding bevel gears 11, mounted on the roll driving shafts 12. Worms 13 are keyed to shafts 12 and drive worm gears 14 which are mounted on shafts 15, 16 and 17 on which the rolls 2, 2, 3, 3 and 4, 4 are respectively mounted. The worms and worm gears on one side of the tube 1 are of opposite hand from those on the other side of tube 1 as shown in Fig. 1. This causes the rolls on opposite sides of the tube to be rotated in opposite directions so that their contiguous sides move in the same direction to feed the tube through the machine.

The heating unit 6 is made up of a series of coils 18 which are separated and supported by the magnetizable laminated comb-shaped core members 19. These cores 19 are arranged radially of the heat insulating protective shield or tube 20 and are supported at their outer edges by the frame 21. The construction of the heating unit 6 is best shown in Figs. 5 and 6 and may be of the same type of construction whether the machine is to be used for welding, annealing or other heating operation.

The heat insulating tube 20 may be made of porcelain or other suitable material and serves to help insulate the cores and coils 18 from the heated tube 1.

Water cooling means are also provided to assist in cooling the coils 18 and cores 19. The inside diameter of coils 18 is larger than the outside diameter of insulating tube 20 and in the V-shaped spaces between the coils and adjacent pole pieces water cooling pipes 22 may be placed. These may be insulated from the tooth-like poles 19a of the comb shaped core members 19 by insulation as shown by heavy lines at 22a. The ends of these pipes 22 are connected by headers 23. The headers preferably do not completely surround the axis of the work, but have spaced ends leaving an opening 23a to prevent the flow of electric current that might be induced in them if a closed circuit were formed around the axis of the work. Partitions 24 are provided in these headers 23 as shown in Figs. 5 and 7 so that the water or other cooling medium which enters through the inlet pipe 25 passes through each of the pipes 22 before it leaves through the outlet pipe 26. Pipes 22 are shown triangular in shape and they may fit snugly in the spaces between the coils 18 and pole pieces 19a as shown in Fig. 5, in order to readily absorb heat from these parts.

Fig. 9 shows a machine similar to that of Fig. 1 except that it is adapted for annealing seamless or welded tubes or bar stock rather than welding open seam tubes. In this machine no seam guide is provided and the heat insulating tube 20 is shown extended in the direction of tube travel. This holds the heat in the seamless or welded tube 27 and aids in the annealing. This elongated tube 20 may be cut apart or have openings in it to allow the feed rolls 3a, 3a, and 4a, 4a to contact with the tube and these rolls may be made of non heat conducting material so as not to absorb heat from the tube. It will be understood that a suitable non-oxidizing gas or other agent may be maintained within tube 20 if desired.

Brackets 28 are provided to support the sections of insulating tube 20 which may extend for any desired distance and be cut open wherever it need be to provide space for feed rolls, as shown in Fig. 9.

Fig. 4 is a diagrammatic view showing how the coils 18 of the heating unit 6 are wound and the direction of current in them. It also shows by dotted arrows 37 the path and direction of the lines of force set up by the coils and passing through the pole pieces and the work. Of the coils 29, 30, 31, 32, 33 and 34, coils 29, 31 and 33 are energized in one direction and coils 30, 32 and 34 are energized in the opposite direction. The coils are shown connected in series, but it will be understood that they may be connected in any desired manner as to series or parallel relation. For clearness the coils are shown in Fig. 4 as being made up of only one turn of wire each but it will be evident to those skilled in the art that the number of turns required in each coil depends upon various factors such as voltage and frequency of the the current, kind and characteristics of work metal, work diameter and wall thickness, work speed, etc. The alternating current passing through coil 29 in the direction indicated by the arrow will set up lines of force which will surround the coil and pass through the pole pieces 35 and 36, and the work, 1, as indicated by the dotted lines 37. The current in coil 30 flows in a direction opposite to that in coil 29 and the lines of force surrounding coil 30 will flow in a direction opposite to that in which those surrounding coil 29, flow. As the current in the remainder of the coils flows in opposite directions in alternate coils, the lines of magnetic force surrounding each coil will flow in opposite direction to those surrounding the adjacent coils. This is illustrated in Fig. 4 by the dotted lines and arrowheads 37. When the work is in the magnetic fields set up by the alternately oppositely wound coils, currents are induced in the metal of the work and tend to flow around its circumference as indicated by the arrows 38 in Fig. 4. If an open seam tube, 1, is to be welded the resistance of the seam is greater than at any other part of the circumference of the tube and consequently the greatest heat will be developed at the seam. If a tube to be welded passes through the successive magnetic fields set up by the coils 29, 30, 31, 32, 33 and 34 the currents induced in the tube produce a cumulative heating effect which, it will be understood, may be so correlated to the speed of travel of the tube that the seam edges will reach the welding temperature at approximately the time the tube 1 leaves the last magnetic field. Suitable means such as the pressure rolls 4, 4 may be employed then to force the tube edges together with the proper pressure to produce a weld.

It will be understood that if the work is to be merely heated, it will not be necessary to exert welding pressure upon it.

I do not limit my invention to any specific number of coils 18 as it is evident that the heat developed at the seam of tube 1, if the tube is to be welded, or in the entire tube or other work 27, if it is to be annealed, will depend on the strength of the current induced in the work and the length of time the metal of the work is subjected to the heating effect of such current. It is obvious that the speed of travel of the work relative to the coils, 18, determines this time factor. This induced current is influenced by several factors among which are strength and frequency of the current in coils 18, size and thickness of the work, whether the work is to be welded or heated for other purpose and speed of travel of work through the magnetic fields set up by the coils. For some purposes a small number of coils carrying a large current will give the best results while for others a larger number of coils and a smaller energizing current may be better.

The pitch of the poles, i. e., the distance from the centre of one pole to the centre of the next as measured in the direction of movement of the work, preferably is to be made as small as possible without too greatly increasing the magnetic leakage between the poles. By making the distance between the pole centers short the zones of maximum current flow, which zones are between the poles, will be close together and the time required for a given point on the work to pass from one zone of maximum current flow to the next will be so short that the heat developed in the metal of the work while the point is passing through one such zone will not be too greatly dissipated before it enters the next zone. It is pointed out, however, that the length of each pole piece in the direction of movement of the work preferably should not be less than twice the thickness of the metal constituting the work if the work be of magnetizable metal, such as iron or steel.

It will be understood by those skilled in the art that the magnetic yokes, cores and poles must be of sufficient cross section to carry the requisite number of magnetic lines of force, and the coils must have the requisite number of turns and have passed through them the requisite energizing current to induce such electromotive forces in the work that the resulting currents will develop the requisite heat to raise the work to the desired temperature.

The induction of current in the work may be augmented if a core of magnetizable material be positioned on the opposite side of the work from the poles, as for instance the core 39. This core 39, for small diameters of tubes, may consist of a number of wires of magnetic material held together at their ends in suitable anchoring sockets 40 and held in proper position in the tube by the rod 41. Rod 41 may be supported at its outer end in any suitable manner. If the work tube be large enough a laminated core may be used.

The laminated comb-shaped radial core members 19 serve to aid the magnetic lines of force set up by the coils 18 to pass through the zone of travel of the tube. These lines of force will follow the paths shown in dotted lines 37 in Fig. 4. As the inner ends of the pole pieces 19a completely surround the tube, the magnetic field which passes through the wall of the tube will be stronger than it would otherwise be, and the induced electromotive forces will be cumulative throughout the girth of the tube. The current induced in the tube is limited by the voltage developed which in turn depends on the number of lines of force that "cut" the tube per unit of time. For this reason it is advantageous to have the tube pass through as dense a magnetic field as possible.

In addition to creating a dense magnetic field in the path of tube travel my pole piece construction allows the inside diameter of coils 18 to be large enough to permit the water cooling pipes 22 to be inserted between the coils 18 and the work, thus preventing harmful rise in temperature of the coils 18.

The heat insulating refractory conduit 20 also aids in protecting the coils 18 from the heat generated in the tube. In the annealing machine shown in Fig. 9 it also serves to retain the heat in the tube after the tube has left the heating zone.

The same heating unit may be used for either welding butted tube or annealing seamless, welded, or butted tube, or rods of suitable size and cross section to be passed through conduit 20. The energizing current, however, will not be the same for welding and annealing and if a machine is to be made to perform both operations it must, of course, be designed to withstand the heaviest load, whether it occur in a welding or in another kind of heating operation.

I do not limit myself to the specific apparatus shown in the drawings and described in this specification, as it will be evident to those skilled in the art that modifications may be made without departing from the scope of my invention.

I claim:

1. In apparatus for heating elongated metallic articles a plurality of magnetic cores each having plurality of poles spaced longitudinally and disposed radially of a common axis, said magnetic cores being spaced circumferentilly around said axis to leave an open passage between the inner ends of the poles for receiving the work to be heated and electric conductor coils surrounding said passage between said poles.

2. In apparatus for heating elongated tubes a plurality of magnetic cores, each having a plurality of poles spaced longitudinally and disposed radially of a common axis, said magnetic cores being spaced circumferentially around said axis to leave an open passage between the inner ends of the poles for receiving the work to be heated, electric conductor coils surrounding said passage between said poles, and a central magnetic core disposed in said passage and spaced from said poles to permit the wall of the tube being heated to pass between said metal core and said poles.

3. Apparatus for heating metallic articles comprising a plurality of electric conductor coils, said coils having openings thru their centers and being arranged in axially spaced relation with said openings in alignment, a plurality of magnetic cores disposed circumferentially around and extending longitudinally of the axis of said coils, each of said cores having a plurality of poles separated longitudinally and extending radially inwardly between said spaced apart coils, a heat insulating tube extending longitudinally of said openings in said coils adjacent the inner ends of said poles, means for causing alternating electric current to flow in said coils, means for causing metallic articles to be heated to travel through said last insulating tube and means for cooling said coils.

4. Apparatus for heating metallic articles comprising a plurality of electric conductor coils, said coils having openings thru their centers and being arranged in spaced apart relation with said openings in alignment, a plurality of magnetic cores disposed radially around and extending longitudinally of the axis of said coils, each of said cores having a plurality of poles separated longitudinally and extending radially inward between said spaced apart coils, a heat insulating tube extending longitudinally of said openings in said coils and supported adjacent the inner ends of said poles, means for causing alternating electric current to flow in said coils and means for causing the metallic articles to be heated to travel through said heat insulating tube.

5. Apparatus for heating metallic articles comprising a plurality of electric conductor coils, said coils having openings through their centers and being arranged in axially spaced relation with said openings in alignment, a plurality of magnetic cores disposed circumferentially around and extending longitudinally of the axes of said coils, each of said cores having a plurality of poles separated longitudinally and extending radially inwardly between said spaced coils, but short of the axis thereof, thus forming openings through which said metallic articles may pass, means for causing alternating electric current to flow in said coils and means for causing metallic articles to travel through said openings.

6. Apparatus for heating metallic articles comprising a plurality of electric conductor coils arranged in axially spaced relation, a magnetic core disposed outside of said coils extending longitudinally of the axis of said coils, said core having a plurality of poles separated longitudinally and extending inwardly between said spaced coils, means for causing alternating electric current to flow in said coils and means for causing metallic articles to travel through said coils past said poles.

7. Apparatus for heating metallic articles comprising a plurality of electric conductor coils arranged in axially spaced relation, a magnetic core disposed outside of said coils extending longitudinally of the axis of said coils, said core having a plurality of poles separated longitudinally and extending radially inwardly between said spaced coils, means for causing alternating electric current to flow in said coils and means for causing metallic articles to travel through said coils past said poles.

8. Apparatus for heating metallic articles comprising a plurality of electric conductor coils having openings adapted to have said metallic articles moved into and out of them, said coils being arranged in spaced relation in a row with said openings in alignment, a magnetic core disposed outside of said coils extending longitudinally of the row of coils, said core having a plurality of poles spaced longitudinally of said core and extending inwardly between said coils, and means for causing metallic articles to travel through said openings and past said poles.

9. Apparatus for heating metallic articles comprising a plurality of electric conductor coils having openings adapted to have said metallic articles moved into and out of them, said coils being arranged in spaced relation in a row with said openings in alignment, an external magnetic core disposed outside of said coils extending longitudinally of the row of coils, said core having a plurality of poles spaced longitudinally of said core and extending inwardly transversely of said row of coils, an internal magnetic core extending longitudinally of said row of coils within said coils and spaced from the inner surfaces of said coils and said poles, and means for moving metallic articles into and out of the space between said internal core and said coils and poles.

10. In apparatus for heating metallic articles a plurality of electric conductor coils adapted to surround the work, magnetic cores spaced circumferentially around said work and having magnetic poles separating said coils and extending radially inwardly into close proximity with the work and means for causing alternating electric current to flow in said coils.

11. In apparatus for heating metallic articles a plurality of electric conductor coils adapted to surround the articles to be heated, magnetic cores disposed circumferentially around said coils extending longitudinally of the axis thereof and having magnetic poles extending inwardly between said coils towards the axis of said coils, and means for causing alternating electric current to flow in said coils.

12. In apparatus for heating metal articles a plurality of spaced laminated magnet poles each having an aperture surrounding a common axis, a plurality of electric conductor coils, each having an aperture surrounding said axis, said coils being disposed in the spaces between said poles, magnet yokes connecting said magnet poles and means for causing alternating current to flow in said coils.

13. In apparatus for heating metal articles a plurality of radial groups of spaced laminated magnet poles each radial group of poles having an aperture surrounding a common axis, a plurality of electric conductor coils, each having an aperture surrounding said axis, said coils being disposed in the spaces between said poles, a magnet yoke connecting said magnet poles, means for causing alternating electric current to flow in said coils, and means for moving said metal articles into and out of the passage formed by said apertures.

14. In apparatus for heating metallic articles a plurality of axially spaced electric-conductor coils adapted to have said articles fed through their openings, a plurality of magnetic cores disposed around the axis of said coils outside of said coils and having poles extending radially inwardly between said coils toward the axis thereof, means for causing alternating electric current to flow in said coils and means for feeding said articles through the openings in said coils past said poles.

15. Apparatus for inducing heating currents in metallic articles comprising a plurality of magnetic cores disposed in circumferentially spaced relation about a common axis and each having spaced poles extending radially inwardly towards but short of said said axis forming a series of axially spaced magnet poles around said axis, a plurality of electric conductor coils surrounding said axis between said poles, means for causing alternating electric current to flow in said coils and means for moving said metallic articles into and out of the space surrounded by said poles and coils.

16. In apparatus for inducing electric heating currents in progressively longitudinally moving metallic tubes, a plurality of axially-spaced electric conductor coils, a plurality of magnetic cores circumferentially spaced about said coils and extending longitudinally of the axis thereof, each of said cores having a plurality of poles extending radially inwardly between said coils, a heat resisting tube within said coils adjacent the inner ends of said poles, means for moving said metallic tube progressively through said heat resisting tube, a magnetic core adapted to be held in position in said metallic tube opposite said poles and means for causing alternating current to flow in said coils.

17. Apparatus for inducing electric heating currents in metallic tubes, comprising a heat resisting tube, means for causing said metallic tube to move into and out of said heat resisting tube, a plurality of comb-shaped magnetic cores disposed radially around said heat resisting tube with their open ends adjacent to said heat resisting tube, a plurality of electric conductor coils surrounding said heat resisting tube and disposed longitudinally of the axis thereof, said coils being separated by the radially extending tooth-like members of said comb-shaped magnetic cores, a magnetic core adapted to be held in position inside said metallic tube and opposite the inner ends of said comb-shaped cores and means for causing alternating current to flow in said coils.

18. Apparatus for heating metallic articles comprising a plurality of electric conductor coils having their apertures in axial alignment, said coils being axially spaced from each other, and a plurality of circumferentially spaced magnetic pole pieces extending between said coils radially towards the axis thereof, the inner ends of said pole pieces being radially spaced from said axis to provide a passage for the reception of the articles to be heated.

19. Apparatus for inducing electric heating currents in metallic articles comprising a plurality of magnetic pole pieces disposed radially of but spaced from a common axis to provide an opening for the reception of the articles to be heated, said pole pieces being spaced longitudinally of said axis, a plurality of electric conductor coils surrounding said axis between said pole pieces, a yoke of magnetizable material connecting the outer ends of adjacent pole pieces outside of said coils and means for causing alternating electric current to flow in said coils.

20. In apparatus of the class described a plurality of magnetic pole pieces each having an aperture with a substantially continuous surface constituting a pole face, said pole pieces being disposed in spaced relation, a plurality of electric conductor coils between said pole pieces having apertures in axial alignment with the apertures in said pole pieces, and means for causing alternating electric current to flow in said coils, the connections of said coils being such as to make adjacent pole pieces of opposite polarity when said current is flowing.

21. In apparatus of the class described, a plurality of magnetic pole pieces each having an aperture having a substantially continuous surface constituting a pole face, said pole pieces being disposed in spaced relation with their apertures in alignment, a plurality of electric conductor coils between said pole pieces having apertures in alignment with the apertures in said pole pieces, means for causing alternating electric current to flow in said coils, the connections of said coils being such as to make adjacent pole pieces of opposite polarity when said current is flowing, said aligned apertures forming a work receiving passage, and a magnetic core disposed in said passage extending longitudinally thereof and being smaller in transverse cross section than said passage to provide space between said pole pieces and said core for the reception of hollow or tubular articles to be heated.

22. Apparatus for inducing electric heating currents in metallic articles, comprising a plurality of magnetic pole pieces disposed transversely to a common axis each having a substantially continuous pole face surrounding and spaced from said axis to provide an opening for the reception of the articles to be heated, said pole pieces being spaced longitudinally of said axis, and means for energizing said pole pieces with rapidly alternating lines of magnetic force with adjacent pole faces of opposite polarity.

23. Apparatus for inducing electric heating currents in metal comprising a plurality of magnetic pole pieces disposed transversely to a common axis and having substantially continuous pole faces surrounding and spaced from said axis at their inner extremities forming a work receiving passage, said pole pieces being spaced longitudinally of said axis, means for energizing said pole pieces with rapidly alternating lines of magnetic force with adjacent poles of opposite polarity, and means for supporting the work adjacent to said pole faces in the fields of said alternating lines of magnetic force.

24. Apparatus for heating metallic articles comprising a plurality of electric conductor coils disposed in axially spaced relation, a magnetic core extending longitudinally parallel to the axis of said coils, said core having a plurality of poles separated longitudinally and extending radially between said spaced coils, each pole having a substantially continuous face surrounding but spaced from said axis, and means for causing alternating electric current to flow in said coils to energize said core and poles with rapidly alternating lines of magnetic force with adjacent pole faces of opposite polarity.

25. Apparatus for heating metallic articles comprising a plurality of electric conductor coils disposed in axially spaced relation, a magnetic core extending longitudinally parallel to the axis of said coils, said core having a plurality of poles separated longitudinally and extending radially between said spaced coils, each pole having a substantially continuous face surrounding but spaced from said axis, means for causing alternating electric current to flow in said coils to energize said core and poles with rapidly alternating lines of magnetic force with adjacent pole faces of opposite polarity, and a core of magnetizable material disposed adjacent to but spaced from said pole faces.

26. In apparatus of the class described, a plurality of electric conductor coils disposed in axially spaced-apart relation, the series of apertures in said coils forming a work-receiving passage, means for energizing said coils so that the magnetic fields of adjacent coils are opposed, and a magnetic core disposed in said passage extending longitudinally thereof and being smaller in transverse cross section than said passage to provide space between said coils and said core for the passage of the articles to be heated.

27. In apparatus of the class described, a plurality of electric conductor coils disposed in axially spaced-apart relation, means for energizing said coils so that the magnetic fields of adjacent coils are opposed, and a magnetic core extending in an axial direction along said coils and spaced therefrom to provide a passage between said coils and said core for the passage of articles to be heated, and means for energizing said coils with rapidly alternating electric current.

28. In apparatus for heating metallic articles, a plurality of axially-spaced electric conductor coils, a heat resisting tube extending longitudinally of the axis of said coils within the space enclosed within said coils, means for moving the articles into and out of said heat resisting tube and means for causing electric current to flow in said coils, the direction of flow of current in one coil being opposite to the direction of flow of current in the adjacent coil.

29. In apparatus for heating metallic articles, a plurality of axially-spaced electric conductor coils, a heat resisting tube extending longitudinally of the axis of said coils within the space enclosed within said coils, means for moving the articles into and out of said heat resisting tube and means for causing electric current to flow in said coils, the direction of flow of current in one coil being opposite to the direction of flow of current in the adjacent coil, and a magnetic core held in position in said heat resisting tube and spaced therefrom to provide a passage for said metallic articles between said tube and said core.

30. In apparatus for heating metallic articles, a plurality of axially-spaced electric conductor coils disposed in axial alinement, means for moving articles to be heated into and out of the space surrounded by said coils, and means for causing electric current to flow in said coils, the direction of flow of current in one coil being opposite to the flow of current in the adjacent coil.

31. Apparatus for heating metallic tubes, means for moving and guiding the tube endwisely, a magnetic body outside of the path of movement of the tube, another magnetic body inside of the path of movement of said tube, one of said bodies having radial poles extending into close proximity to the path of movement of the tube, said poles being spaced apart axially, and a plurality of coils arranged in the spaces between said pole pieces.

32. Apparatus for heating metallic tubes, means for moving and guiding the tube endwisely, a magnetic body outside of the path of movement of the tube, another magnetic body inside of the path of movement of said tube, one of said bodies having radial poles extending into close proximity to the path of movement of the tube, said poles being spaced apart axially, and a plurality of coils arranged in the spaces between said pole pieces, the adjacent ones of said coils being wound in opposite directions so that the magnetic fields of adjacent coils are opposed.

In testimony whereof, I have hereunto subscribed my name this 26th day of February, 1929.

FRANK L. SESSIONS.